(12) United States Patent
Rune et al.

(10) Patent No.: US 10,285,204 B2
(45) Date of Patent: May 7, 2019

(54) NETWORK NODE, A WIRELESS DEVICE AND METHODS THEREIN FOR PERFORMING RANDOM ACCESS IN A CELL

(71) Applicant: Telefonaktiebolaget LM Ericsson (publ), Stockholm (SE)

(72) Inventors: Johan Rune, Lidingö (SE); Magnus Stattin, Upplands Väsby (SE); Johnny Karout, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 8 days.

(21) Appl. No.: 15/548,270

(22) PCT Filed: Mar. 5, 2015

(86) PCT No.: PCT/SE2015/050245
§ 371 (c)(1),
(2) Date: Aug. 2, 2017

(87) PCT Pub. No.: WO2016/140605
PCT Pub. Date: Sep. 9, 2016

(65) Prior Publication Data
US 2018/0035466 A1    Feb. 1, 2018

(51) Int. Cl.
*H04W 74/08*    (2009.01)
*H04W 48/16*    (2009.01)
*H04W 8/26*    (2009.01)

(52) U.S. Cl.
CPC ....... *H04W 74/0833* (2013.01); *H04W 48/16* (2013.01); *H04W 74/08* (2013.01); *H04W 8/26* (2013.01)

(58) Field of Classification Search
CPC . H04W 74/0833; H04W 48/16; H04W 74/08; H04W 8/26
See application file for complete search history.

(56) References Cited

U.S. PATENT DOCUMENTS

2008/0304410 A1    12/2008 Park et al.
2010/0091704 A1*    4/2010 Ianev ............... H04W 48/12
                                              370/328
(Continued)

FOREIGN PATENT DOCUMENTS

WO    2007077250 A2    7/2007
WO    2008084949 A1    7/2008

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 13)," Technical Specification 23.401, Version 13.1.0, 3GPP Organizational Partners, Dec. 2014, 310 pages.

(Continued)

*Primary Examiner* — Ian N Moore
*Assistant Examiner* — Latresa A McCallum
(74) *Attorney, Agent, or Firm* — Sage Patent Group

(57) ABSTRACT

A network node: receives first random access messages from the two or more wireless devices comprising identical random access preambles; transmits a second random access message comprising a first temporary identity to the two or more wireless devices; receives third random access messages from the two or more wireless devices, wherein at least one of the third random access messages comprises a second temporary identity; determines different identities for the two or more wireless devices using at least one received second temporary identity; and transmits a fourth random access message to the two or more wireless devices using and/or comprising the identity of the two or more wireless devices, respectively, which identity is to be used by each of the two or more wireless devices, respectively, when connected to the cell.

30 Claims, 6 Drawing Sheets

(56) References Cited

U.S. PATENT DOCUMENTS

2013/0231086 A1    9/2013  Naik et al.
2013/0242915 A1*   9/2013  Lee ...................... H04L 1/1671
                                                              370/329

OTHER PUBLICATIONS

International Search Report and Written Opinion for International Patent Application No. PCT/SE2015/050245, dated Nov. 23, 2015, 15 pages.
Extended European Search Report for Application No. 15884104.9, dated Sep. 19, 2018, 10 pages.

* cited by examiner

NETWORK NODE, A WIRELESS DEVICE AND METHODS THEREIN FOR PERFORMING RANDOM ACCESS IN A CELL

This application is a 35 U.S.C. § 371 national phase filing of International Application No. PCT/SE2015/050245, filed Mar. 5, 2015, the disclosure of which is incorporated herein by reference in its entirety

TECHNICAL FIELD

Embodiments herein relate to random access in a wireless communications network. In particular, embodiments herein relate to a network node and method therein for responding to wireless devices performing random access in a cell served by the network node in a wireless communication network. In particular, embodiments herein also relate to a first wireless device and method therein for enabling a network node in a wireless communication network to respond to the first wireless device when the first wireless device performs random access in a cell served by the network node.

BACKGROUND

In a typical wireless, cellular or radio communications network, wireless devices, also known as mobile stations, terminals, and/or User Equipment, UEs, communicate via a Radio-Access Network, RAN, with one or more core networks. The RAN covers a geographical area which is divided into cells, with each cell being served by a base station, e.g. a radio base station, RBS, or network node, which in some networks may also be called, for example, a "NodeB", "eNodeB" or "eNB". A cell is a geographical area where radio coverage is provided by the radio base station at a base station site or an antenna site in case the antenna and the radio base station are not collocated. One radio base station may serve one or more cells.

A Universal Mobile Telecommunications System, UMTS, is a third generation mobile communication system, which evolved from the second generation, 2G, Global System for Mobile Communications, GSM. The UMTS terrestrial radio-access network, UTRAN, is essentially a RAN using wideband code-division multiple access, WCDMA, and/or High-Speed Packet Access, HSPA, to communicate with user equipment. In a forum known as the Third Generation Partnership Project, 3GPP, telecommunications suppliers propose and agree upon standards for third generation networks and UTRAN specifically, and investigate enhanced data rate and radio capacity. In some versions of the RAN, as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio-Access Network, E-UTRAN, also known as the Long-Term Evolution, LTE, radio access, and the Evolved Packet Core, EPC, also known as System Architecture Evolution, SAE, core network. E-UTRAN/LTE is a variant of a 3GPP radio-access technology wherein the radio base station nodes are directly connected to the EPC core network rather than to RNCs. In general, in E-UTRAN/LTE the functions of a RNC are distributed between the radio base station nodes, e.g. eNodeBs in LTE, and the core network. As such, the Radio-Access Network, RAN, of an EPS has an essentially flat architecture comprising radio base station nodes without reporting to RNCs.

FIG. 1 shows an example of a network access procedure performed in a wireless communications network for a wireless device. In this example, the wireless communications network is based on EPS/LTE. However, other wireless communications network based on other wireless communication technology may also comprise a similar network access procedure.

The network access procedure starts with a random access, RA, procedure for synchronizing with and gaining initial access to the wireless communications network, as shown in FIG. 1 by Actions 101-104. The RA procedure also serves the purpose of assigning the wireless device with a unique identity when establishing an initial radio link to a network node serving a cell in the wireless communications network. The network access procedure also comprises a Radio Resource Control, RRC, connection establishment procedure which serves to perform authentication, to configure the connection, and to establish appropriate states on higher layers. The RRC connection establishment procedure may be said to actually start in Action 103 in FIG. 1, but is continued in Actions 105-1028. After the RRC connection establishment procedure, the wireless device has transitioned from a RRC_IDLE state to a RRC_CONNECTED state in the wireless communication network and may begin transmitting and receiving data, as shown in FIG. 1 by Actions 1029-1034. Note that Actions 105-1034 are not further described herein, but may e.g. be found in the standard 3GPP TS 23.401 V13.1.0 (2014-12), section 5.3.2.

As shown in the example of FIG. 1, the RA procedure in the wireless communications network may comprise the following actions 101-104.

Action 101

The wireless device, denoted UE in FIG. 1, transmits a RA preamble on the Physical Random Access Channel, PRACH to the network node, denoted eNB in FIG. 1. This message is commonly denoted RA Msg1. Each cell in the wireless communications network may have its own set of RA preambles. However, RA preambles may also be reused between cells, but preferably not in adjacent cells. Optionally, the RA preambles may also be divided into two groups, e.g. group A and group B. In this case, the UE may then select the group from which to pick a preamble, e.g. at random, based on the potential message size, i.e. the potential message size being the data available for transmission in Action 103 plus MAC header and any possible MAC control elements, and the channel quality, e.g. estimated in terms of the measured downlink path loss. Here, two conditions may be met for the wireless device to select a preamble from group B, i.e. the potential message size has to exceed a certain threshold and the estimated path loss has to be lower than a certain threshold.

Action 102

In response to the RA preamble, the network node transmits a Random Access Response, RAR, to the UE using a broadcast identifier, such as, for example, a Random Access Radio Network Temporary Identifier, RA-RNTI. The RAR also includes an uplink, UL, grant, i.e. an allocation of uplink transmission resources, for the wireless device. This message is commonly denoted RA Msg2.

The RAR Packed Data Unit, PDU, may comprise a back-off indicator and zero or more Medium Access Control, MAC, RAR. Each MAC RAR contains a temporary identifier, i.e. a Temporary Cell Radio Network Temporary Identifier, TC-RNTI. Each MAC RAR further contains a timing advance command, an uplink grant and a reserved bit. The MAC PDU header contains one MAC sub-header, i.e. Random Access Preamble ID, RAPID, sub-header, for each MAC RAR that is included in the RAR PDU. Each such corresponding MAC sub-header, or RAPID sub-header, includes a RA preamble identifier which indicates the received RA preamble that the corresponding MAC RAR pertains to. Hence, in this way each MAC RAR is mapped to a RA preamble that is transmitted by the wireless device and received by the network node in Action 101 and PRACH resource.

Action 103

Here, the wireless device transmits an RA message containing a pre-set identity in a RRCConnectionRequest message. This message is commonly denoted RA Msg3. In a Frequency Division Duplex, FDD, mode, this RA Msg3 may be transmitted 6 or 7 subframes after the reception of the RAR in Action 102 depending on the parameters in the UL grant received in Action 102. In a Time Division Duplex, TDD, mode, the timing also depends on the configuration of UL and downlink, DL, subframes.

The pre-set identity which the wireless device includes in the RRCConnectionRequest message is a SAE Temporary Mobile Subscriber Identity, S-TMSI, if the S-TMSI is available. The S-TMSI is a 40-bit determined identity, which is assigned by the Mobility Management Entity, MME, and which consists of the MME Group ID, MMEGI, and the MME Code, MMEC. This is typically the case unless the wireless device is accessing the wireless communications network from a DETACHED state, e.g. when the wireless device is turned on. Alternatively, the pre-set identity which the wireless device includes in the RRCConnectionRequest message may, if no S-TMSI is available, be a 40-bit random number.

Action 104

In response to the RA message in Action 103, the network node transmits the identity of the wireless device to be used in the cell on the DL together with an RRCConnectionSetup message. The identity of the wireless device may be contained in a UE Contention Resolution Identity MAC Control Element or as a parameter in the RRCConnectionSetup message. This message is commonly denoted RA Msg4.

In case of possible RA preamble collisions of two or more wireless devices, the result of the contention resolution in the network node is communicated through the above mentioned identity of the wireless device in this RA Msg4. It should also be noted that the RRCConnectionSetupComplete message in Action 105 is herein considered to not form a part of the RA procedure, but may still be a part of the RRC connection establishment procedure when the RA procedure has been concluded.

Contention resolution in a network node serves to resolve a situation where two or more wireless devices in the same cell happen to use the same RA preamble in the same PRACH resource, e.g. in Action 101. In this case, the two or more wireless devices will both assume that they are the intended recipient of the RA message in Action 102 from the network node, i.e. RA Msg2. Consequently, both of the two or more wireless devices will send an RRCConnectionRequest message in RA Msg3 to the network node in Action 103. The network node will then at best correctly receive one of these messages. The network node may then indicate which of the two or more wireless devices that it is responding to by including the identity of the wireless device, for which it correctly received the RA Msg3, in the RA Msg4.

However, in a worst case scenario, the network node may not be able to receive any one of the RA Msg3 messages. In this case, all of the two or more wireless devices using the same RA preamble in the same RA resource, i.e. PRACH resources, will fail to access the wireless communications network. A wireless device that fails the RA procedure has to restart the RA procedure. This has several adverse consequences, for example, increased radio resource consumption which puts a further strain on the RA resources, increased RA load, increased interference, increased processing load in the network node, delayed network access and increased energy consumption in the wireless device.

One option to solve this issue would be to largely increase the resources available in the wireless communications network for the RA procedure. However, this is not a very practical or economically feasible option, since this would wastefully over-dimension resources which may only be fully used during occasions of high network access loads.

SUMMARY

It is an object of embodiments herein to improve the handling of RA preamble collisions in a wireless communications network.

According to a first aspect of embodiments herein, the object is achieved by a method performed by a network node for responding to two or more wireless devices performing random access in a cell served by the network node in a wireless communication network. The network node receives first random access messages from the two or more wireless devices comprising identical random access preambles. The network node then transmits a second random access message comprising a first temporary identity to the two or more wireless devices. In response, the network node receives third random access messages from the two or more wireless devices, wherein at least one of the third random access messages comprises a second temporary identity. Then, the network node determines different identities for the two or more wireless devices using at least one received second temporary identity. The network node further transmits a fourth random access message to the two or more wireless devices using and/or comprising the identity of the two or more wireless devices, respectively, which identity is to be used by each of the two or more wireless devices, respectively, when connected to the cell.

According to a second aspect of embodiments herein, the object is achieved by a network node for responding to wireless devices performing random access in a cell served by the network node in a wireless communication network. The network node comprises a receiver configured to receiving first random access messages comprising the same random access preamble from at least a first and a second wireless device. Also, the network node comprises a transmitter configured to transmit a second random access message comprising a first temporary identity to the first and second wireless device in response to the first random access messages. The receiver is further configured to receive a third random access message from each of the first and second wireless device, wherein at least one of the third random access messages comprises a second temporary identity. Furthermore, the network node comprises a processor configured to determine a different identity for each of the first and second wireless device from the first temporary identity, the at least one second temporary identity, and at least one third temporary identity. The transmitter is also further configured to transmit a fourth random access message to each of the first and second wireless device using and/or comprising each of their determined identities, respectively, which determined identities are to be used by each of the first and second wireless device when connected to the cell.

According to a third aspect of embodiments herein, the object is achieved by a method performed by a first wireless device for enabling a network node in a wireless communication network to respond to the first wireless device when the first wireless device performs random access using the same random access preamble as at least a second wireless device in a cell served by the network node. The first wireless device transmits a first random access message comprising a random access preamble to the network node. In response, the first wireless device receives a second random access message comprising a first temporary identity from the network node. The first wireless device also selects a second temporary identity of the first wireless device. Then, the first wireless device then transmits a third random access message to the network node using the first temporary identity, wherein the third random access message comprises the second temporary identity of the first wireless device.

According to a fourth aspect of embodiments herein, the object is achieved by a first wireless device for enabling a network node in a wireless communication network to respond to the first wireless device when the first wireless device performs random access using the same random access preamble as at least a second wireless device in a cell served by the network node. The first wireless device comprise a transmitter configured to transmit a first random access message comprising a random access preamble to the network node. The first wireless device also comprises a receiver configured to receive a second random access message comprising a first temporary identity from the network node. Furthermore, the first wireless device comprises a processor configured to select a second temporary identity of the first wireless device. The transmitter is further configured to transmit a third random access message to the network node using the first temporary identity, wherein the third random access message comprises the second temporary identity of the first wireless device.

According to a fifth aspect of embodiments herein, the object is achieved by a computer program, comprising instructions which, when executed on at least one processor, cause the at least one processor to carry out the method described above. According to a sixth aspect of embodiments herein, the object is achieved by a carrier containing the computer program described above, wherein the carrier is one of an electronic signal, optical signal, radio signal, or computer readable storage medium.

By receiving a second temporary identity from at least one of the two or more wireless devices using identical RA preambles and using this second temporary identity to determine different identities for the two or more wireless devices, the network node is able to uniquely respond to each of the two or more wireless devices and thus resolve their RA preamble collision in the network node.

From a wireless device's point of view, this means that fewer RA attempts from the wireless device in the wireless communications network will fail and the network access latency for the wireless device will be reduced. From a network node's point of view, this means that the contention resolution in the network node is improved, which in turn also improves the utilization of the PRACH capacity and allows the network node to handle a larger amount of random access attempts. The latter is particularly advantageous during high network access loads.

Hence, the handling of RA preamble collisions in a wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
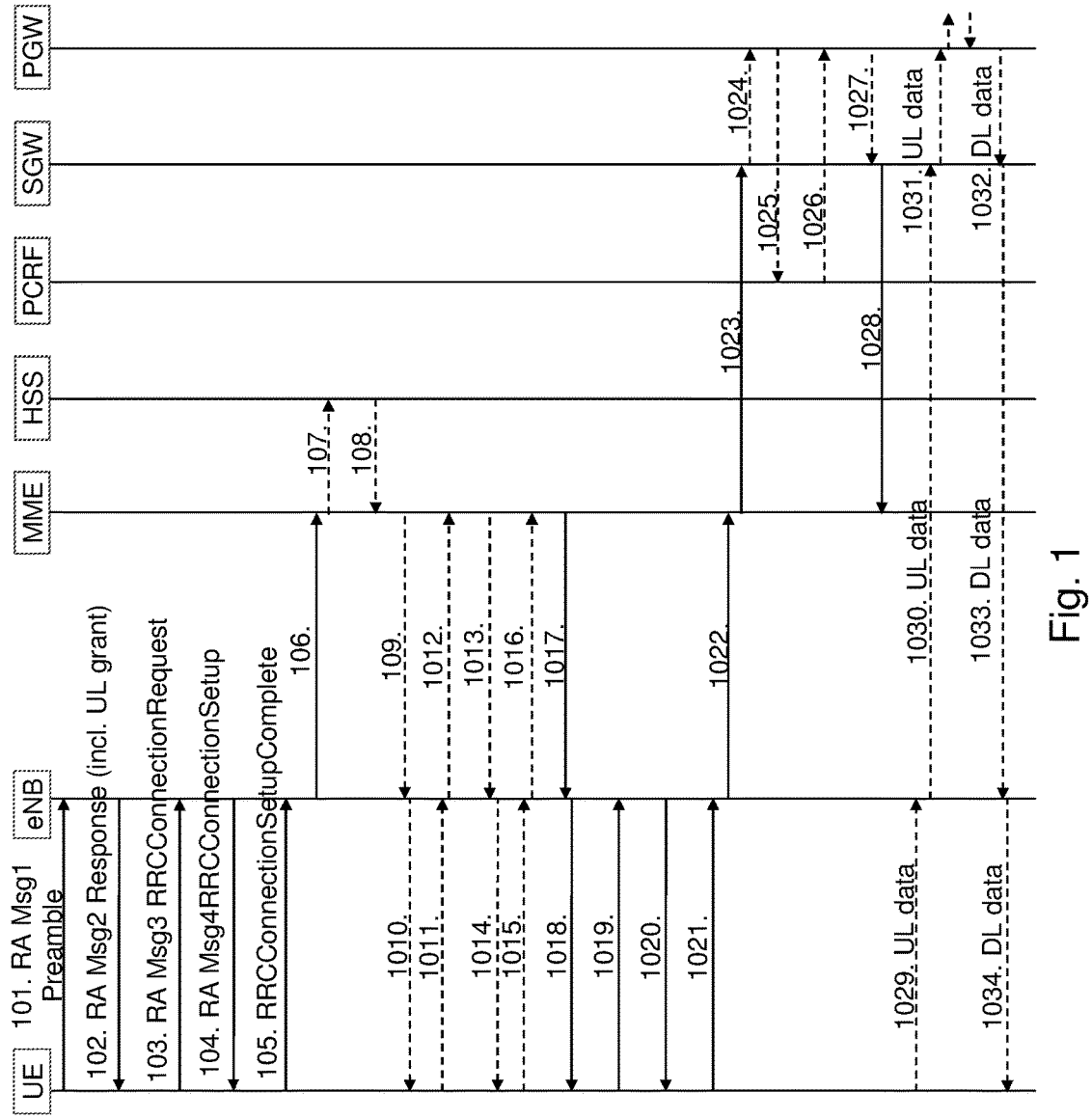
FIG. 1 is a signalling diagram illustrating a random access procedure.

The figures are schematic and simplified for clarity, and they merely show details which are essential to the understanding of the embodiments presented herein, while other details have been left out. Throughout, the same reference numerals are used for identical or corresponding parts or steps.

Figure 2:
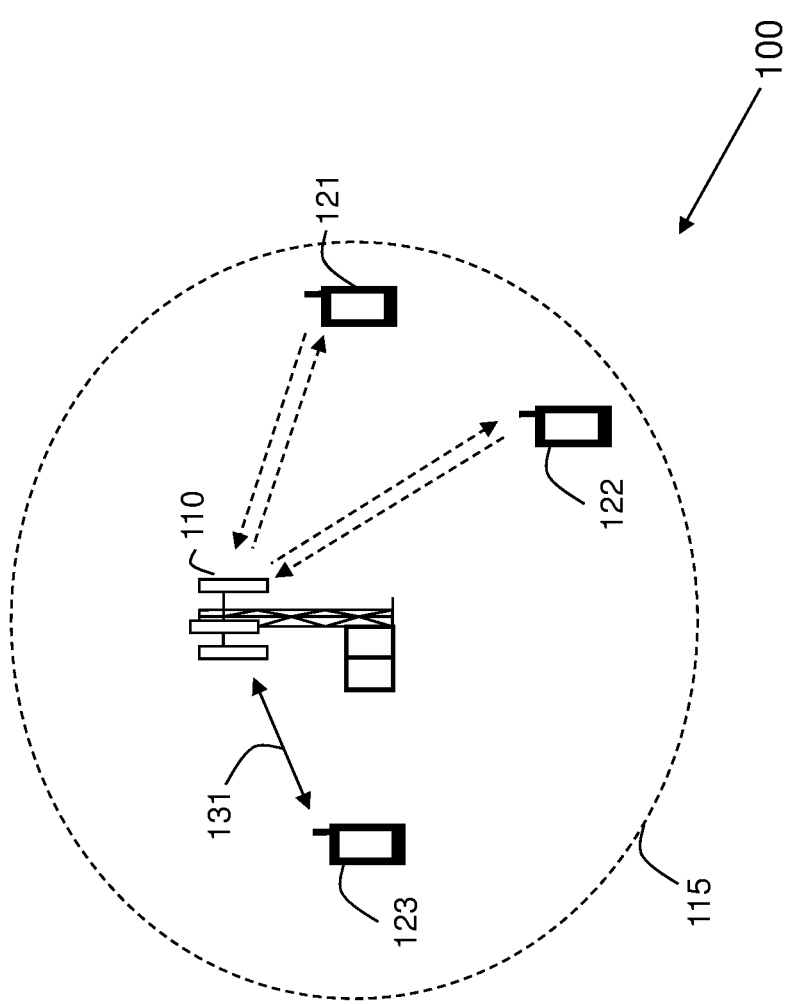
FIG. 2 is a schematic block diagram illustrating embodiments of a network node and wireless devices in a wireless communications network.

FIG. 2 shows an example of a wireless communications network 100 in which embodiments herein may be implemented. Although illustrated in FIG. 1 as an LTE network, the wireless communications network 100 may be any wireless or radio communication system, such as, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other 3GPP cellular network or system.

The wireless communications system 100 comprises a network node 110. The first network node 110 may e.g. be an eNB, eNodeB, or a Home Node B, a Home eNode B, femto Base Station (BS), pico BS or any other network unit capable to serve a wireless device in the wireless communications system 100. The network node 110 may also be e.g. a radio base station, a base station controller, a network controller, a relay node, a repeater, an access point, a radio-access point, a Remote Radio Unit (RRU) or a Remote Radio Head (RRH). Furthermore, the network node 110 comprises multiple antennas for wireless radio communication with wireless devices located within their coverage range; that is, the network node 110 may use one or more of its antennas to provide radio coverage within its cell 115.

A first and a second wireless device 121, 122 are located within the cell 115. The two or more wireless devices 121, 122 may e.g. be any kind of wireless device such as a mobile phone, a cellular phone, a Personal Digital Assistant (PDA), a smart phone, a tablet, a sensor or actuator with wireless communication capabilities, a sensor or actuator connected to or equipped with a wireless device, a Machine Device (MD), a Machine-Type-Communication (MTC) device, a Machine-to-Machine (M2M) communication device, D2D capability, a wireless device with D2D capability, a Customer-Premises Equipment (CPE), a Laptop-Mounted Equipment (LME), a Laptop-Embedded Equipment (LEE), etc.

In FIG. 1, the two or more wireless devices 121, 122 are in the process of accessing the wireless communication network 1100 via the network node 110. Once connected, the two or more wireless devices 121, 122 are configured to communicate within the wireless communications network 100 via the network node 110 over a radio link while present in the cell 115 served by the network node 110.

Figure 3:
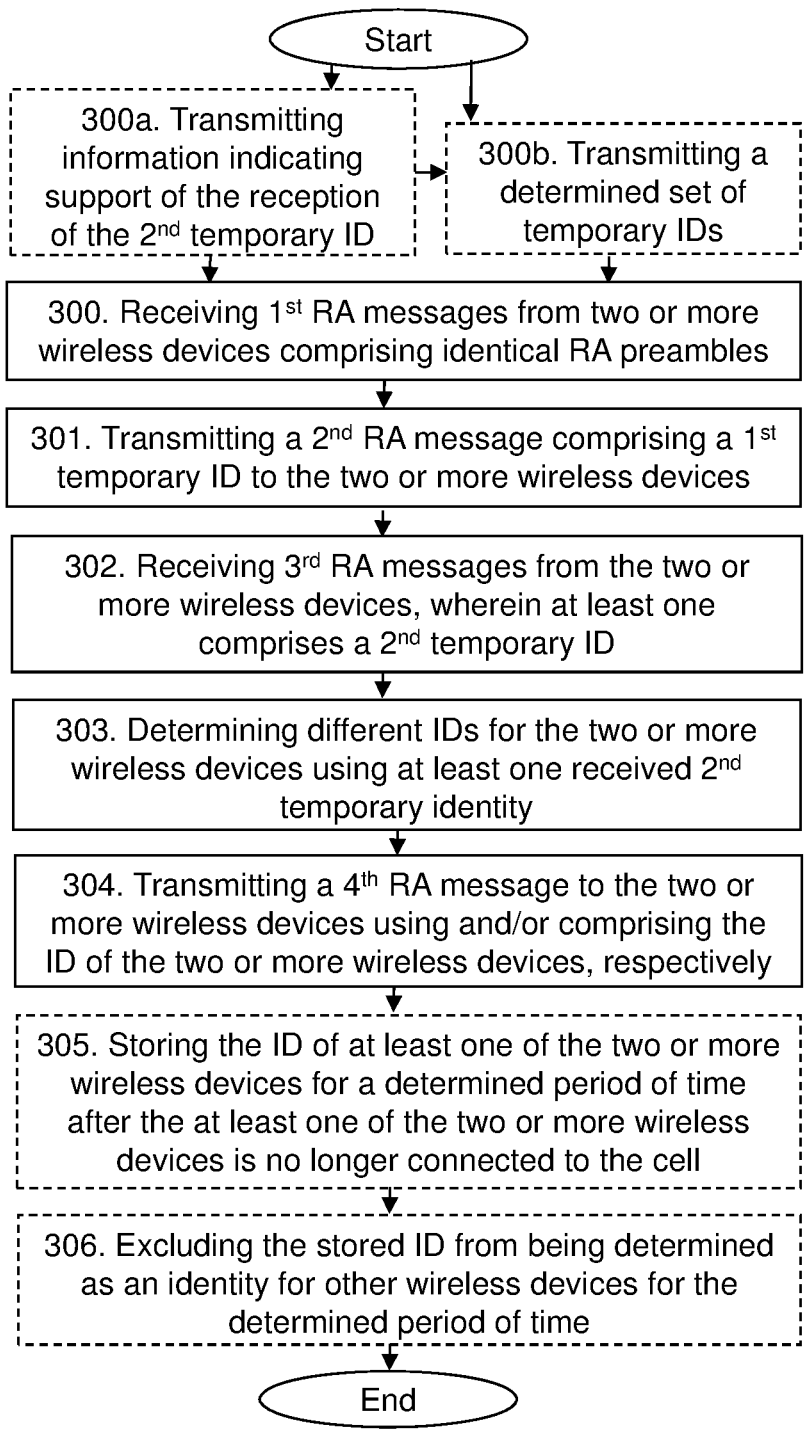
FIG. 3 is a flowchart depicting embodiments of a method in a network node.

A third wireless device 123 is also located within the cell 115. In FIG. 3, the third wireless device 123 is connected to the wireless communication network 100 and configured to communicate within the wireless communications network 100 via the network node 110 over a radio link 131 while present in the cell 115 served by the network node 110. Furthermore, although embodiments below are described with reference to the scenario of FIG. 1, this scenario should not be construed as limiting to the embodiments herein, but merely as an example made for illustrative purposes.

As part of developing the embodiments herein, it has been noticed that high network access loads will occur in wireless communications networks because the network access load varies with the local circumstances. The high network access load may occur in wireless communications networks either by chance, such as, e.g. when a number of wireless devices happen to attempt to access the wireless communications network more or less simultaneously, or by being triggered by a specific situation, such as, e.g. in case of an event that causes a lot of users of wireless devices to gather in a relatively small area.

High network access load scenarios may also be expected to be more common place with the increasing amount of connected wireless devices and possible ubiquitous deployment of such connected wireless devices. In future developments of wireless communications networks, a large number of connected wireless devices may be envisioned, which typically transmit and receive only small amounts of data more or less infrequently, such as, e.g. from once a week to once per minute. Such connected wireless devices may e.g. be different types of autonomous sensors or actuators which may communicate with application servers within or outside the wireless communications network. This type of communication is often referred to as Machine-to-Machine, M2M, communication and the autonomous wireless devices may be denoted as Machine Devices, MDs. Alternative terms for this type of communication and devices are Machine Type Communication, MTC, and MTC devices. Hence, the predicted large numbers of such connected devices, possibly in combination with the fact that a significant portion of these connected devices are expected to be various kinds of sensor or actuator devices whose communication may be triggered by events occurring in and around their environment, may be expected to make high network access loads more common since it increases the chances of having large number of sensor devices that are triggered by a common event and attempt to access the wireless communications network more or less simultaneously.

An example of when such high network access loads scenarios may occur comprise, for example, MTC devices in the form of sensor devices which monitor states of technological systems or processes or sensor devices monitoring various environmental aspects, such as temperature, pressure or vibrations. For such MTC devices, external events, such as, e.g. a power grid failure, an earthquake, a pipeline damage or an industrial process failure, may trigger a large amount of relatively densely located MTC devices to attempt to access the wireless communications network more or less simultaneously for the purpose of reporting the triggering events to their respective application servers. According to another example, synchronized access bursts may also be caused by poor design or configuration of applications, such as, e.g. involving synchronized periodic reporting from many MTC devices.

Besides MTC devices and MTC applications, high network access loads scenarios may also be caused by regular wireless devices, e.g. by themselves or in combination with the access load regularly caused by MTC devices. This kind of high network access loads scenarios may occur, for example, even without any extraordinary actions from the MTC devices in a cell, such as, e.g. in a stadium-like environment where many users of wireless devices are trying to access the wireless communications network at the same time. Here, a triggering event may, for example, be when a football team scores or when a game has just ended.

The random access, RA, procedure relies on the statistically low probability that a large number of wireless devices attempt to access the wireless communications network simultaneously and that the probability is low that the wireless devices that do attempt to access the wireless communications network simultaneously also selects the same RA preamble. However, when such a RA preamble collision still occurs, the result is at best that one of the wireless devices succeeds to access the wireless communications network. In the worst case, all the wireless devices using the same preamble in the same RA resource fail to access the wireless communications network, and will have to restart the RA procedure all over again.

Since, as indicated above, the frequency of high access load situations are likely to increase rather than decrease in the future which means that the risk of RA preamble collisions will also increase. This is because the risk of RA preamble collisions will be higher when the network access load in the wireless communication network is high. In these situations, an increased RA load caused by such RA preamble collisions - and the resulting RA re-attempts - will be particularly harmful, since it may further escalates an already bad situation. Therefore, issues related to repeated RA attempts by wireless devices in a wireless communications network due to RA preamble collisions, which is pronounced in cells with high network access loads or overloads, needs to be addressed.

In accordance with the embodiments described herein, this is addressed by receiving a second temporary identity from one or more of the wireless devices using the same RA preamble to access the wireless communication network and using one or more second temporary identities when determining the identities of the wireless devices. This enables the network node to uniquely respond to each of the one or more wireless devices and resolve the RA preamble collision.

Example of embodiments of a method performed by a network node 110 for responding to wireless devices 121, 122 performing random access in a cell 115 served by the network node 110 in a wireless communication network 100, will now be described with reference to the flowchart depicted in FIG. 3. FIG. 3 illustrates an example of actions or operations which may be taken by the network node 110. The method may comprise the following actions.

Action 300*a*

In this optional action, the network node 110 may transmit information indicating that the network node 110 supports the reception of third random access messages comprising second temporary identities from the two or more wireless devices 121, 122. This may advantageously allow the network node 110 to inform the two or more wireless devices 121, 122 in cell 115 that the network node 110 is capable of receiving second temporary identities in a third random access message prior to the two or more wireless devices 121, 122 attempts to perform random access in the wireless communication network 100. This is also particularly advantageous when not all network nodes in the wireless communications network are updated to support the reception of third random access messages comprising second temporary identities, since in such cases the inclusion of a second temporary identity in a third random access message by the two or more wireless devices 121, 122 may confuse such network node and may cause unknown behaviour or even a discarding of the third random access message.

This may, for example, be performed as part of a system information broadcast transmission in the cell 115. In this case, the information may be introduced as a parameter in the system information, which parameter indicates whether or not the network node 110 supports receiving second temporary identities in a third random access message. Here, legacy wireless devices, i.e. devices not capable of transmitting a second temporary identity in a third random access message, may simply ignore the parameter. However, non-legacy wireless devices, such as, the two or more wireless devices 121, 122, may read the parameter and only include a second temporary identity in the third random access message when it is indicated by the parameter that the network node 110 supports this feature.

Action 300*b*

Optionally, the network node 110 may also transmit a determined set of temporary identities to at least one of the two or more wireless devices 121, 122 from which determined set the second temporary identity is to be randomly selected, wherein the determined set of temporary identities comprises temporary identities that are not included in another set of temporary identities from which the network node 110 selects the first temporary identity of wireless devices in the cell 115. This advantageously enables the network node 110 to avoid the risk of having a second temporary identity which is randomly selected by one of the two or more wireless devices 121, 122 already being in use as an identity for another wireless device in the cell, such as, e.g. by the third wireless device 123 in cell 115. This determined set may, for example, be transmitted as part of a system information broadcast transmission or as part of the second random access message to at least one of the two or more wireless devices 121, 122 in Action 301.

In other words, the network node 110 may set aside a dedicated set of temporary identities as a pool of temporary identities from which second temporary identities may be randomly selected by the two or more wireless devices 121, 122, e.g. when a previously allocated C-RNTI that has not timed out and pertains to the same cell 115 is not available. This set of temporary identities will then not be used by the network node 110 as identities for wireless devices in the cell 115, i.e. as Cell Radio Network Temporary Identifiers, C-RNTIs. This dedicated set of temporary identities, for example, a determined number of Radio Network Temporary Identifiers, RNTIs, e.g. 256 or another suitable number, may be set in a standard and thus known by the two or more wireless devices 121, 122. It may also be signalled by the network node 110 to the two or more wireless devices 121, 122 in the system information in the cell 115 or be included in a Random Access Response, i.e. RA Msg2.

Thus, each of the two or more wireless devices 121, 122, which has received the dedicated set of temporary identities, is able to randomly select its second temporary identity, e.g. Random RNTI, R-RNTI, from this dedicated set of temporary identities and transmit this second temporary identity to the network node 110 in the third random access message in Action 302. However, in order to further avoid that any of the temporary identities in this dedicated set of temporary identities is used as an identity for a wireless device in the cell 115, the second temporary identity should not be promoted, i.e. converted, by the network node 110 into the identity of the one of the two or more wireless devices 121, 122 in the cell 115. Instead the network node 110 should allocate another identity to be used in the cell 115 to the one of the two or more wireless devices 121, 122 in the fourth random access message in Action 304. This may be performed even though the second temporary identity is used on the Physical Downlink Control CHannel, PDCCH, by the network node 110 when scheduling the fourth random access message in Action 304. The identity of the one of the two or more wireless devices 121, 122 in the cell 115 may be allocated by the network node 110 in a RRCConnectionSetup message, or in a C-RNTI MAC Control Element, CE, of the MAC PDU carrying the RRCConnectionSetup message, in the fourth random access message in Action 304.

Furthermore, when the network node 110 has transmitted a determined set of identities to the two or more wireless devices 121, 122, the two or more wireless devices 121, 122 may indicate its randomly selected second temporary identity as an offset to the start or beginning of the range of temporary identities constituting the dedicated set of temporary identities. This may, for example, be performed in order to reduce the size of the overhead caused by inclusion of the second temporary identity in the third random access message in Action 302.

Alternatively, in the second random access message in the below Action 301 to the two or more wireless devices 121, 122, the network node 110 may dynamically signal a set of temporary identities that are currently available for selection as second temporary identities by the two or more wireless devices 121, 122. In this case, this set of available temporary identities may be indicated by the network node 110 in various different ways.

One option may be for the network node 110 to indicate a temporary identity and a number. The number may indicate the size of a range of temporary identities that starts or begins with the indicated temporary identity. Another option may be for the network node 110 to use the first identity of the two or more wireless devices 121, 122 in the second random access message as a reference around which a certain number of numerically adjacent temporary identities are available for the selection. The number of numerically adjacent temporary identities may be set in the standard and thus be known by the two or more wireless devices 121, 122 or indicated by the network node 110 in the system information in the cell 115 whereby it may be omitted in the second random access message. Alternatively, the number of the numerically adjacent temporary identities may be explicitly indicated by the network node 110 in the second random access message. It should be noted that in this case the network node 110 would have to choose the first identity of the two or more wireless devices 121, 122 in the second random access message appropriately so that a suitable number of numerically adjacent temporary identities are available.

Also, in these cases, when the network node 110 has dynamically signalled a set of temporary identities that are currently available for selection as second temporary identities by the two or more wireless devices 121, 122, the two or more wireless devices 121, 122 may indicate the second temporary identity as an offset to the start or beginning of the range of temporary identities constituting the set of available temporary identities.

Action 300

The network node 110 receives first random access messages from the two or more wireless devices 121, 122 comprising identical random access preambles. These first random access messages may be RA preamble messages, such as, for example, RA Msg1 in the RA procedure in FIG. 1. The first random access messages may comprise identical random access preambles simply due to the fact that the two or more wireless devices 121, 122 happen to have randomly selected to use the same preamble. In the context of the example in FIG. 1, this action may be said to correspond to Action 101 as previously described.

Action 301

In response to receiving first random access messages comprising identical random access preambles in Action 300, the network node 110 transmits a second random access message comprising a first temporary identity to the two or more wireless devices 121, 122. The second random access message may be a Random Access Response, RAR, message, e.g. RA Msg2 in the RA procedure in FIG. 1. In the context of the example in FIG. 1, this action may be said to correspond to Action 102 as previously described.

Action 302

The network node 110 receives third random access messages from the two or more wireless devices 121, 122. Here, at least one of the third random access messages comprises a second temporary identity. The third random access message may correspond to, for example, the RA Msg 3 in the RA procedure in FIG. 1. Thus, the third random access message may comprise a Radio Resource Control, RRC, connection request message. Since each of the two or more wireless devices 121, 122 used the same RA preamble in the first random access message in Action 301, each of the two or more wireless devices 121, 122 will regard itself as the target destination of the second random access message in Action 301. Therefore, each of the two or more wireless devices 121, 122 will believe that they have been allocated the first temporary identity, e.g. the same Temporary C-RNTI, TC-RNTI, provided in RA Msg 2. Consequently, each of the two or more wireless devices 121, 122 will use the same first temporary identity, e.g. TC-RNTI, when transmitting the third random access message to the network node 110, e.g. in RA Msg 3 in the RA procedure in FIG. 1. Conventionally, and as previously mentioned, this will at best cause one of the two or more wireless devices 121, 122 to be allocated transmission resources in the fourth random access message in Action 304, e.g. in RA Msg 4 in the RA procedure in FIG. 1. This means that the one of the two or more wireless devices 121, 122 will have the first temporary identity, e.g. TC-RNTI, promoted or converted into its identity, e.g. C-RNTI, in the cell 115 in the wireless communication network 100. The remainder of the two or more wireless devices 121, 122 will then have to restart the RA procedure.

However, as indicated above, at least one of the two or more wireless devices 121, 122 will here indicate a second temporary identity in the third random access message in addition to the first identity in the second random access message in Action 301, e.g. a RNTI is included in the RA Msg 3 in addition to scrambling the message with a sequence derived at least partly from the TC-RNTI received in RA Msg 2. In other words, the first identity in the second random access message in Action 301, e.g. the TC-RNTI, is used in the transmission of the third random access message, i.e. for scrambling the message, while the second temporary identity, e.g. the additional RNTI, is comprised in the third random access message. The second temporary identity, or additional RNTI, may be an identity that one of the two or more wireless devices 121, 122 has previously used in the cell 115, such as, e.g. a previously used C-RNTI, or a second temporary identity that is randomly selected by one of the two or more wireless devices 121, 122, i.e. a randomly selected RNTI. The latter may also be referred to as a Random RNTI, R-RNTI. In some embodiment, the network node 110 may receive the second temporary identity, e.g. the additional RNTI, in the third random access message, for example, as included in a C-RNTI MAC Control Element of the MAC PDU carrying a RRCConnectionRequest message in RA Msg 3, or alternatively, as included in a new Information Element, IE, in the RRCConnectionRequest message itself.

It should be noted that it is here assumed that the network node 110 is able to decode several simultaneous third random access messages from the two or more wireless devices 121, 122 using the same identical RA preamble, i.e. having colliding RA preambles. This may, for example, be performed by using successive interference cancellation and/or spatial multiplexing.

Action 303

After receiving the third random access messages in Action 302, the network node 110 determines different identities for the two or more wireless devices 121, 122 using at least one received second temporary identity. Since the network node 110 may use the second temporary identity provided by at least one of the two or more wireless devices 121, 122 to differentiate between the two or more wireless devices 121, 122 using the same first temporary identity, i.e. the same TC-RNTI, the network node 110 is here able to uniquely address each of the two or more wireless devices 121, 122 separately in the fourth random access message in Action 304 by determining a different identity for each of the two or more wireless devices 121, 122. It should be noted that the determined identities of the two or more wireless devices 121, 122 are also different from the identities of all other wireless devices connected to the cell 115.

In some embodiments, the network node 110 may determine one of the identities of the two or more wireless devices 121, 122 as the first temporary identity, and determining another one of the identities of the two or more wireless devices 121, 122 using at least one received second temporary identity. Optionally, the network node 110 may determine one or more of the identities of the two or more wireless devices 121, 122 using at least one third temporary identity determined by the network node 110. Examples of how and when this may be performed are described in the examples below.

According to one example, the network node 110 may determine the first temporary identity, i.e. the TC-RNTI, as the identity to be used in the cell 115, i.e. C-RNTI, for the last of the two or more wireless devices 121, 122 from which the network node 110 received and decoded a third random access message; this, while for the rest of the two or more wireless devices 121, 122, the network node 110 may determine their respective second temporary identities, i.e. their additional RNTI, or a third temporary identity determined in the network node 110 as their identities to be used in the cell 115, i.e. their C-RNTIs. Optionally, when one of the two or more wireless devices 121, 122 is a wireless device not capable of providing a secondary temporary identity, such as, e.g. a legacy wireless device, the network node 110 may determine the first temporary identity, i.e. the TC-RNTI, as the identity to be used in the cell 115, i.e. C-RNTI, for this wireless device. In case multiple wireless device of the two or more wireless devices 121, 122 are wireless devices not capable of providing a secondary temporary identity, the network node 110 may determine the first temporary identity as the identity to be used in the cell 115 for one of these wireless devices; while the rest of these wireless devices will have to restart the RA procedure.

As previously discussed, according to one example, the two or more wireless devices 121, 122 may transmit a second temporary identity, i.e. additional RNTI, which has been randomly selected by the two or more wireless devices 121, 122 and included in their third random access messages. However, when one of the two or more wireless devices 121, 122 randomly selects a second temporary identity, i.e. R-RNTI, it may in some cases not be ensured that the one of the two or more wireless devices 121, 122 selects a second temporary identity that is not already allocated and/or in use, e.g. as the C-RNTI of the third wireless device 123 in the cell 115. If this is the case, then this may cause the one of the two or more wireless devices 121, 122 to receive Physical Downlink Shared Channel, PDSCH, transmissions that is addressed to the second temporary identity, but that are actually intended for the third wireless device 123 already having the second temporary identity as its identity in the cell 115, e.g. the third wireless device 123 using the R-RNTI as its C-RNTI in the cell 115.

The PDSCH transmission which is wrongfully received by one of the two or more wireless devices 121, 122 will, however, most likely not be a fourth random access message. This means that the one of the two or more wireless devices 121, 122 which expects a fourth random access message from the network node 110 in response to third random access message will thus immediately understand that the PDSCH transmission is intended for the third wireless device 123 in the cell 115. However, the network node 110 may, in this type of situation, use the first temporary identity, i.e. TC-RNTI, indicated in the second random access message, to address the one of the two or more wireless devices 121, 122 in the fourth random access message in Action 304. This may be performed in order to avoid that the third wireless device 123 in the cell 115 erroneously receives the fourth random access message in Action 304; even though, the third wireless device 123 being in an RRC_CONNECTED state probably would not expect a fourth random access message and most likely would discard it. As a precaution, it could also be set or mandated in the standard that wireless devices should discard a received fourth random access message while in a RRC_CONNECTED state in the cell 115. Another possible precaution is that the network node 110 may avoid scheduling downlink transmissions to the third wireless device 123 having the second temporary identity as its identity in the cell 115 during the time period when the one of the two or more wireless devices 121, 122 which randomly selected and transmitted the second temporary identity is listening for the fourth random access message. This eliminates the risk that the one of the two or more wireless devices 121, 122 receive a message that was intended for the third wireless device 123.

In other words, the network node 110 may, in some embodiments, determine the first temporary identity as the identity of one of the two or more wireless devices 121, 122 when a second temporary identity received from the one of the two or more wireless devices 121, 122 corresponds to an identity already in use by a third wireless device 123 connected to the cell 115 or to a second temporary identity received from another one of the two or more wireless devices 121, 122. Furthermore, in some embodiments, the network node 110 may, when a second temporary identity received from one of the two or more wireless devices 121, 122 corresponds to an identity already in use by a third wireless device 123 connected to the cell 115, not perform any scheduling of downlink transmissions to the third wireless device 123 until the network node 100 has transmitted the fourth random access message to the one of the two or more wireless devices 121, 122. In some embodiments, when the network node 110 has transmitted a determined set of temporary identities to at least one of the two or more wireless devices 121, 122 in Action 300b. The network node 110 may determine the first temporary identity or one of the at least one third temporary identity as the identity of one of the two or more wireless devices 121, 122, when a second temporary identity received from the one of the two or more wireless devices 121, 122 is included in the determined set of temporary identities.

Furthermore, in the odd event that one of the two or more wireless devices 121, 122 should happen to randomly select and transmit a second temporary identity to the network node 110 which matches a previously used identity of another one of the two or more wireless device 121, 122 and where this other one of the two or more wireless devices 121, 122 provides its previously used identity as its second temporary identity to the network node 110, the network node 110 may send a fourth random access message addressed to that identity. However, this may be resolved since the fourth random access message may comprise a MAC PDU carrying a RRCConnectionSetup message and which MAC PDU may comprise, in the UE Contention Resolution Identity MAC Control Element, the System Architecture Evolution Temporary Mobile Subscriber Identity, S-TMSI, or a 40-bit random number, which was conveyed in the RRCConnectionRequest message in the third random access message. Hence, this contention between the two or more wireless devices 121, 122 may be resolved through the same means as regular contention resolution. This means that the two or more wireless devices 121, 122, whose S-TMSI, or 40 bit random number, from the RRCConnectionRequest message in the third random access message was not included in the fourth random access message should keep listening for the second temporary identity; this, since the network node 110 may address another fourth random access message to the same second temporary identity—this time with the S-TMSI of the one of the two or more wireless devices 121, 122 choosing the second temporary identity randomly, while still also listening for the first temporary identity received in the second random access message, i.e. the TC-RNTI.

Action 304

Following the determination in Action 303, the network node 110 transmits a fourth random access message to the two or more wireless devices 121, 122 using and/or comprising the identity of the two or more wireless devices 121, 122, respectively. The identity is to be used by each of the two or more wireless devices 121, 122, respectively, when connected to the cell 115. The fourth random access message may correspond to, for example, RA Msg 4 in the RA procedure in FIG. 1. Thus, the fourth random access message may comprise a RRC connection setup message.

Using the identities of the two or more wireless devices 121, 122 as determined in Action 303, the network node 110 is here able to address and transmit a fourth random access message separately to each of the two or more wireless devices 121, 122 with colliding RA preambles from which the network node 110 managed to decode a third random access message in Action 302. For example, this will result in that fewer failed RA access attempts and reduced radio access latency is experience by the two or more wireless devices 121, 122. Furthermore, by in this way increasing the contention resolution efficiency in the network node 110, the utilization of the random access resources, e.g. PRACH resources, will be improved in the network node 110. This will also improve the handling of high network access loads in the network node 110, since consequently, this will facilitate an improved traffic processing in the network node 110, which is crucial in high network access load scenarios where a large number of wireless device are trying to access the wireless communication network 100 in the cell 115 at the same time. In particular, the load on the PRACH, PUSCH, PDSCH, and PDCCH may be reduced. Hence, the resources of PRACH, PUSCH, PDSCH and PDCCH may be used for other data transmissions or signaling instead. In this manner, the wireless communication network 100 will experience an overall better resource efficiency and allow a better performance for the two or more wireless devices 121, 122.

It should also be noted that since the PRACH resources are used more efficiently, operators in the wireless communication network 100 may be able to reduce the amount of radio resources allocated for PRACH.

It may further be noted that, for each of the two or more wireless devices 121, 122, the identity that the network node 110 used when transmitting the fourth random access message to each of the two or more wireless devices 121, 122, i.e. one of the first temporary identity (e.g. TC-RNTI), the second temporary identity (e.g. the additional RNTI, such as, a previously used C-RNTI or R-RNTI) or third temporary identity (e.g. a RNTI selected by the network node 110), this identity is the identity that the network node 110 promotes or converts into the identity to be used in the cell 115 (e.g. C-RNTI) for each of the two or more wireless devices 121, 122. If the identity is the first temporary identity, the fourth random access message is addressed to the first temporary identity and the first temporary identity may optionally also be comprised in the message. Alternatively, when the identity is the first temporary identity, the first temporary identity may only be comprised in the message, while the message is addressed to the second temporary identity. If the identity is the second temporary identity, then the fourth random access message is addressed to the second temporary identity and the second temporary identity may optionally also be comprised in the message. Alternatively, when the identity is the second temporary identity, the second temporary identity may only be comprised in the message, while the message is addressed to the first temporary identity. If the identity is the third temporary identity, then the fourth random access message is addressed to the first temporary identity or the second temporary identity, wherein the third temporary identity is comprised in the message.

Action 305

In this optional action, the network node 110 may store the determined identity of at least one of the two or more wireless devices 121, 122 for a determined period of time after the at least one of the two or more wireless devices 121, 122 is no longer connected to the cell 115. Advantageously, this provides one way of ensuring that the second temporary identity selected by at least one of the two or more wireless devices 121, 122 in the cell 115 is unique for the at least one of the two or more wireless devices 121, 122 in the cell 115.

As previously described, each of the two or more wireless devices 121, 122 may select an identity to be the second temporary identity which has previously been used in the cell 115 by each of the two or more wireless devices 121, 122, respectively, e.g. a previously used or old C-RNTI that each of the two or more wireless devices 121, 122 used when it was in a RRC_CONNECTED state in the cell 115. However, for this to be enabled, the network node 110 should not allocate the previously used identity to another wireless device in the cell 115 during a determined time period after the one of the two or more wireless devices 121, 122 that previously used the identity has left the cell 115 (e.g. due to a handover or loss of coverage), switched to an RRC_IDLE state or has been turned off. Hence, the determined identity of the two or more wireless devices 121, 122 should be stored by the network node 110 for the determined time period. This may preferably also be performed by the two or more wireless devices 121, 122.

It should be noted that during this determined time period, the determined identity of one of the two or more wireless devices 121, 122 still belongs to that one of the two or more wireless devices 121, 122. This means that this one of the two or more wireless devices 121, 122 may select it as its second temporary identity during a subsequent random access procedure in the cell 115. The network node 110 should not only keep track of the identities, e.g. C-RNTIs, allocated to all currently active wireless devices in the cell 115, i.e. wireless devices that are in an RRC_CONNECTED state in the cell 115, but also the identity of each wireless devices which has left the cell 115, switched to an RRC_IDLE state or been turned off, and for which the identity used in the cell 115 has not yet timed out. After the determined period of time has expired for a wireless device which has left the cell 115, switched to an RRC_IDLE state or been turned off, the identity of this wireless device used in the cell 115 may again be allocated by the network node 110 to other wireless devices in the cell 115.

Action 306

When storing the one or more determined identities in Action 305, the network node 110 may also exclude the stored identity of the at least one of the two or more wireless devices 121, 122 from being determined as an identity for other wireless devices in the cell 115 for the determined period of time. This may prevent the network node 110 from allocating previously used identities of the two or more wireless devices 121, 122 to other wireless devices in the cell 115 during a determined time period after the two or more wireless devices 121, 122 has left the cell 115 or switched to an RRC_IDLE state. This is because during this determined time period the at least one of the two or more wireless devices 121, 122 may select its respective stored identity as the second temporary identity if it performs a random access procedure in the cell 115 in which the stored identity was previously used.

Figure 4:
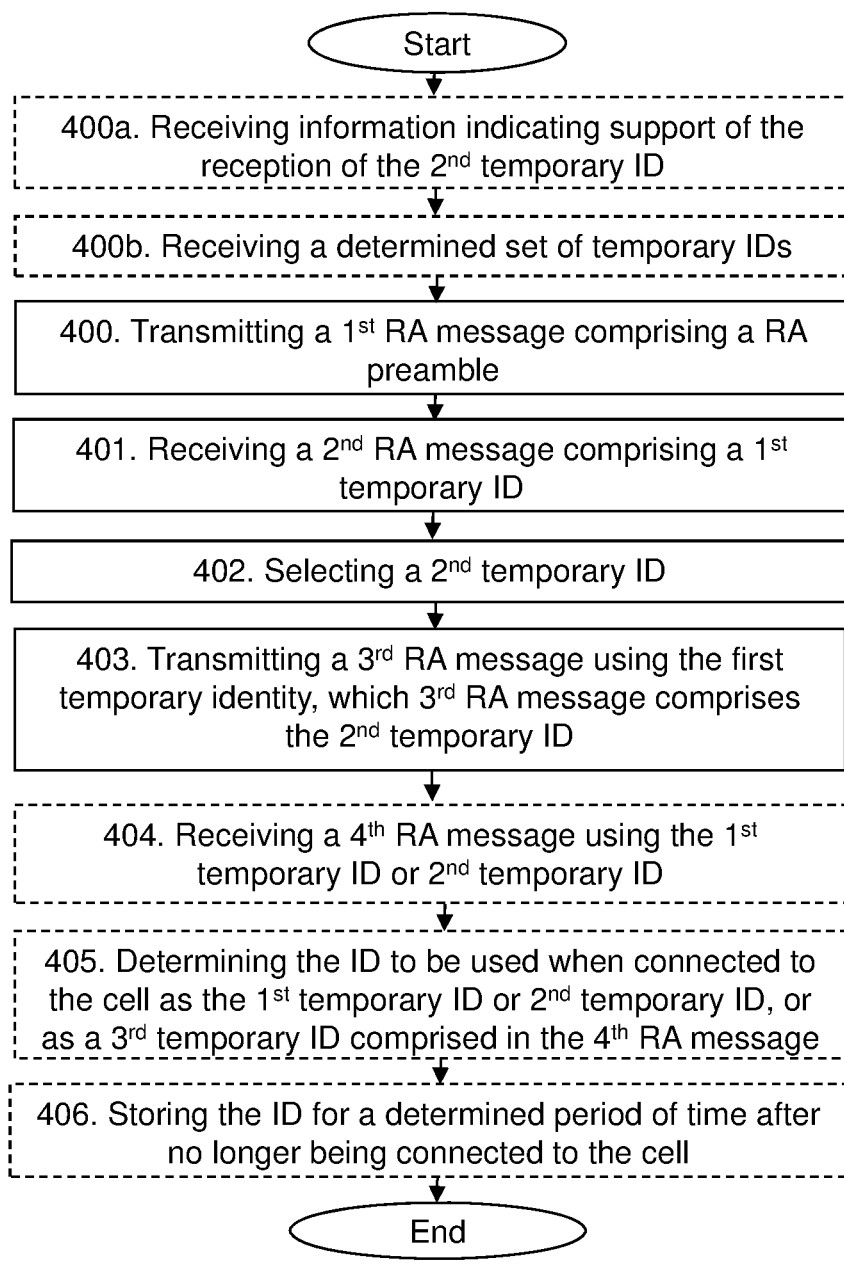
FIG. 4 is a flowchart depicting embodiments of a method in a first wireless device, FIG. 5 are time lines illustrating embodiments of the network node and first wireless device performing random access.

Example of embodiments of a method performed by a first wireless device 121 for enabling a network node 110 in a wireless communication network 100 to respond to the first wireless device 121 when the first wireless device 121 performs random access using the same random access preamble as at least a second wireless device 121, 122 in a cell 115 served by the network node 110, will now be described with reference to the flowchart depicted in FIG. 4. FIG. 4 illustrates an example of actions or operations which may be taken by the first wireless device 121. The method may comprise the following actions.

Action 400a

In this optional action, the first wireless device 121 may receive information indicating that the network node 110 supports the reception of a third random access message comprising a second temporary identity from the first wireless device 121. This may advantageously inform the first wireless device 121 that the network node 110 is capable of receiving second temporary identities in third random access messages prior to the first wireless device 121 attempts to perform random access in the wireless communication network 100. This may, for example, be performed as part of a system information broadcast transmission in the cell 115. The first wireless device 121 may, for example, read the parameter and only include a second temporary identity in the third random access message in Action 403 when it is indicated that the network node 110 supports this.

Action 400b

Optionally, the first wireless device 121 may also receive a determined set of temporary identities from the network node 110. The determined set of temporary identities may, for example, be received from the network node 110 as part of a system information broadcast transmission in the cell 115 or as part of the second random access message from the network node 110 in Action 401.

Action 400

The first wireless device 121 transmits a first random access message comprising a random access preamble to the network node 110. The first random access message may be a RA preamble message, e.g. RA Msg1 in the RA procedure in FIG. 1. In the context of the example in FIG. 1 and as previously described above, this action may be said to correspond to Action 101.

Action 401

In response to the transmission in Action 400, the first wireless device 121 receives a second random access message comprising a first temporary identity from the network node 110. The second random access message may be a Random Access Response, RAR, message, e.g. RA Msg2 in the RA procedure in FIG. 1. In the context of the example in FIG. 1 and as previously described above, this action may be said to correspond to Action 102.

Action 402

In response to receiving the second random access message in Action 402, the first wireless device 121 selects a second temporary identity of the first wireless device 121. This enables a network node 110 uniquely address the first wireless device 121 separately in a fourth random access message in case the first wireless device 121 uses the same RA preamble in the first random access message in the same PRACH resource as at least one second wireless device 122 in the cell 115. The second temporary identity may, for example, be a Radio Network Temporary Identifier, RNTI.

In some embodiments, the first wireless device 121 may select a stored identity in the first wireless device 121 as the second temporary identity. The stored identity may have previously been used by the first wireless device 121 when connected to the cell 115. This enables the first wireless device 121 to select an identity that has previously been used by the first wireless device 121 as an identity, e.g. Cell Radio Network Temporary Identifiers, C-RNTI, in the cell 115 as its second temporary identity.

In some embodiments, the first wireless device 121 may randomly select an identity in the first wireless device 121 as the second temporary identity. This provides an alternative to selecting a previously used identity in the cell 115 as the second temporary identity. This may be advantageous when the first wireless device 121 does not comprise an identity that has been previously used in the cell 115 because, for example, the first wireless device 121 has never had an identity in the cell 115, the previously used identity in the cell 115 has timed out, or the previously used identity in the cell 115 has been lost due to the first wireless device 121 having been turned off.

In this case, according to some embodiments, when the first wireless device 121 has received a determined set of temporary identities in Action 400b, the first wireless device 121 may randomly select the second temporary identity from a determined set of temporary identities, wherein the determined set of temporary identities comprise temporary identities that are not included in another set of temporary identities from which the network node 110 selects the first temporary identity of wireless devices in the cell 115.

Action 403

After selection in Action 403, the first wireless device 121 transmits a third random access message to the network node 110 using the first temporary identity, wherein the third random access message comprises the second temporary identity of the first wireless device 121. The third random access message may correspond to, for example, the RA Msg 3 in the RA procedure in FIG. 1. Thus, the third random access message may comprise a Radio Resource Control, RRC, connection request message. In some embodiments, the first wireless device 121 may indicate the second temporary identity in the third random access message as an offset, either in relation to a start of a range of temporary identities in the determined set of temporary identities or in relation to the first temporary identity.

The first wireless device 121 may also, for example, indicate the second temporary identity in the third random access message, for example, in a C-RNTI MAC control element of a MAC PDU. Alternatively, the first wireless device 121 may indicate the second temporary identity in the third random access message as part of a non-critical extension in an RRCConnectionRequest message comprised in the third random access message. This has the advantage that the second temporary identity may be ignored by a network node that does not support the reception of a third random access message comprising a second temporary identity, and thus will not understand how to use the second temporary identity.

Action 404

In response to the transmitted third random access message in Action 403, the first wireless device 121 may optionally receive a fourth random access message using the first or second temporary identity. The fourth random access message may correspond to, for example, the RA Msg 4 in the RA procedure in FIG. 1. Thus, the fourth random access message may comprise a RRC connection setup message. By using one of the first or second temporary identities when transmitting the fourth random access message to the first wireless device 121, e.g. using the first or second temporary identities to address the message, the first wireless device 121 may implicitly be informed about which temporary identity the network node 110 has promoted or converted into the identity in the cell 115, e.g. C-RNTI, for the first wireless device 121. Alternatively, this may also be given by a third temporary identity comprised in the fourth random access message, in which case the first or second temporary identities is only used to receive the fourth random access message.

Action 405

After receiving the fourth random access message in Action 404, the first wireless device 121 may determine the identity of the first wireless device 121 that is to be used by the first wireless device 121 when connected to the cell 115 as the identity of the first or second temporary identity used in the fourth random access message, or as a third temporary identity comprised in the fourth random access message. This means that the first wireless device 121 determines the identity indicated by the fourth random access message as its identity in the cell 115. This is because this is the identity that the network node 110 promotes or converts into the identity in the cell 115 for the first wireless device 121. If the third temporary identity is comprised in the fourth random access message, the first wireless device 121 may determine the third temporary identity to be used by the first wireless device 121 when connected to the cell 115, otherwise the first wireless device 121 may determine the one of the first temporary identity and the second temporary identity that was used to transmit and to receive the fourth random access message.

Action 405

Optionally, the first wireless device 121 may store the determined identity for a determined period of time when no longer being connected to the cell 115. This enables the first wireless device 121 to select an identity that has previously been used by the first wireless device 121 when connected to the cell 115, i.e. when being in a RRC_CONNECTED state in the cell 115, as the second temporary identity in Action 402 to be used in a subsequent random access procedure. The stored identity may, for example, be the C-RNTI of the first wireless device 121 in the cell 115.

Figure 5:
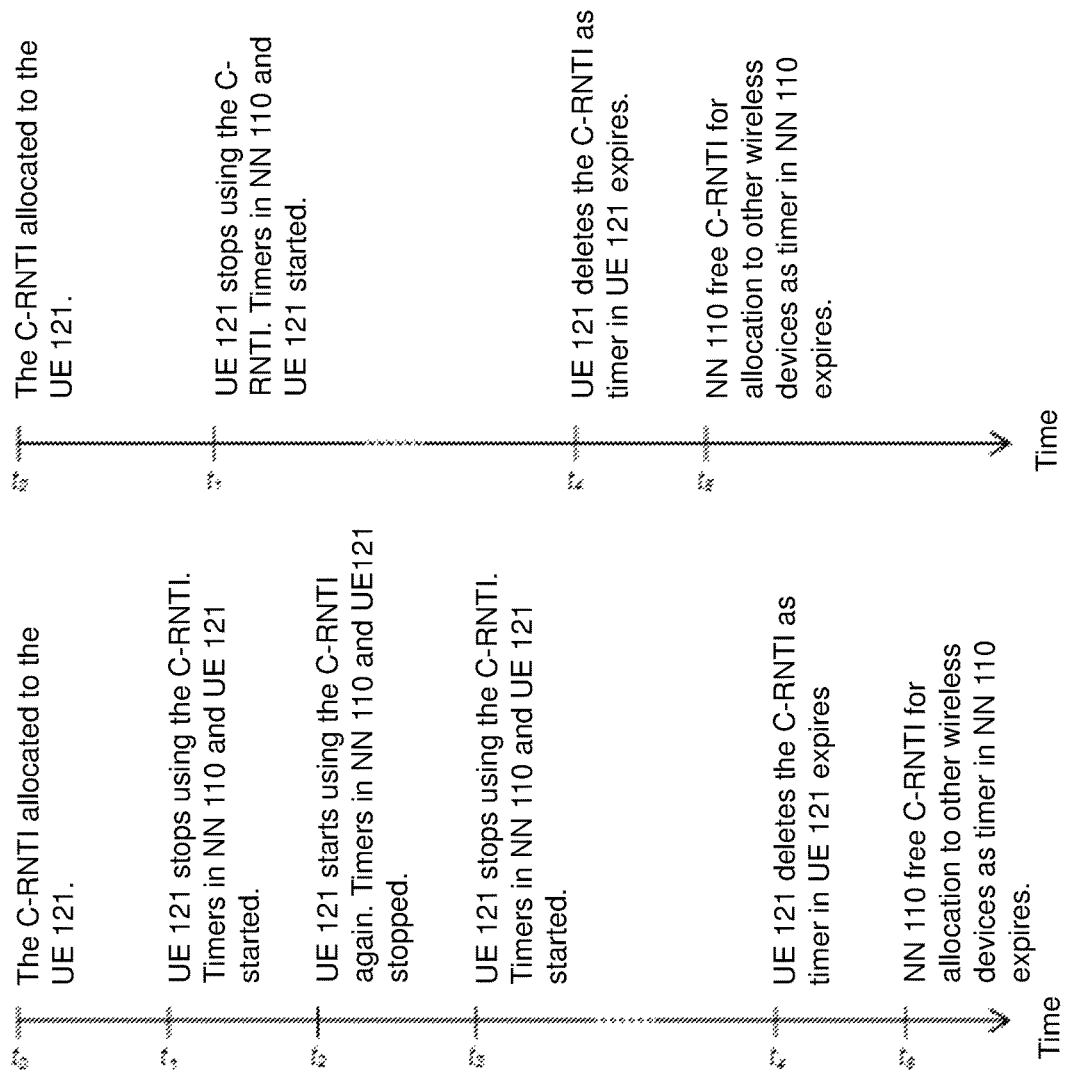

FIG. 5 shows time lines illustrating embodiments of the network node 110, here denoted NN, and first wireless device 121, here denoted UE, performing random access. The time lines in FIG. 5 illustrate two examples of how timers may relate to a stored identity in the network node 110 and how the first wireless device 121 may be configured in order to avoid disadvantageous consequences of imperfect timer synchronization.

In these examples, both the network node 110 and the first wireless device 121 stores the identity of the first wireless device 121, i.e. C-RNTI, after the first wireless device 121 goes into a RRC_IDLE state or leaves the cell 115. Both the network node 110 and the first wireless device 121 may also have corresponding timers, which determine for the time period for how long the network node 110 and the first wireless device 121 should store the C-RNTI of the first wireless device 121, respectively, and be allowed to use it. As a safeguard against timing discrepancies, the network node 110 should keep the C-RNTI allocated slightly longer than the first wireless device 121.

At time $t_0$, the C-RNTI is initially allocated to the first wireless device 121 in the cell 115.

At time $t_1$, the first wireless device 121 stops using the C-RNTI. This may be because the first wireless device 121 ceases to be in an RRC_CONNECTED state in the cell 115; which, for example, may be because the first wireless device 121 has switched to RRC_IDLE state, been handed over to another cell, lost radio coverage or has been turned off. This may then trigger the timers in the first wireless device 121 and in the network node 110 to be started for the storage of the C-RNTI of the first wireless device 121 used in cell 115 and its allocation to the first wireless device 121.

At time $t_2$, the first wireless device 121 may return to RRC_CONNECTED state in the cell 115. This may either be triggered by a first random access message from the first wireless device 121 or because the first wireless device 121 is handed over from another cell. The first wireless device 121 may here provide its previously used C-RNTI in the cell 115 as the second temporary identity in the third random access message. The network node 110 may then use either the first temporary identity, i.e. the TC-RNTI that was included in the second random access message by the network node 110, or the second temporary identity comprised in the third random access message, e.g. the previously used C-RNTI, to address the first wireless device 121 in the fourth random access message. The temporary identity determined by the network node 110 then becomes the C-RNTI of the first wireless device 121 in the cell 115. This may trigger the timers in the first wireless device 121 and in the network node 110 to be stopped.

At time $t_3$, the first wireless device 121 stops using the C-RNTI again. This may, for example, be because the first wireless device 121 ceases to be in a RRC_CONNECTED state in the cell 115. This may again trigger the timers in the first wireless device 121 and in the network node 110 to be restarted for the storage of the C-RNTI of the first wireless device 121 used in cell 115 and its allocation to the first wireless device 121.

At time $t_4$, the timer expires in the first wireless device 121. Here, the first wireless device 121 may delete the C-RNTI because it has timed out and can no longer be used as a second temporary identity by the first wireless device 121.

At time $t_5$, the timer expires in the network node 110. This means that the network node 110 may allocate the C-RNTI to other wireless devices in the cell 115.

Figure 6:
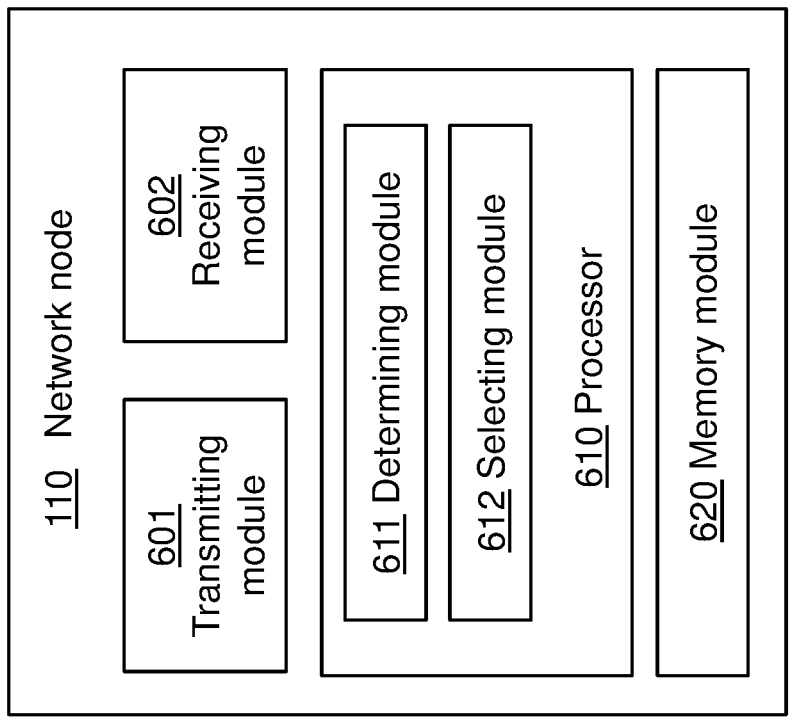
FIG. 6 is a schematic block diagram depicting embodiments of a network node.

To perform the method actions for responding to two or more wireless devices 121, 122 performing random access in a cell 115 served by the network node 110 in a wireless communication network 100, the network node 110 may comprise the following arrangement depicted in FIG. 6.

FIG. 6 shows a schematic block diagram of embodiments of the network node 110. In some embodiments, the network node 110 may comprise a receiving module 601, a transmitting module 602, and a processor 610. The receiving module 701 may also be referred to as a receiver or receiving unit, and the transmitting module 702 may also be referred to as transmitter or transmitting unit.

The receiver 601 is configured to receive first random access messages from the two or more wireless devices 121, 122 comprising identical random access preambles. The transmitter 602 is configured to transmit a second random access message comprising a first temporary identity to the two or more wireless devices 121, 122. The receiver 601 is further configured to receive third random access messages from the two or more wireless devices 121, 122, wherein at least one of the third random access messages comprises a second temporary identity.

The processor 610 may also be referred to as processing module, processing unit or processing circuitry. The processor 610 is configured to determine, or comprise a determining module 611 configured to determine, different identities for the two or more wireless devices 121, 122 using at least one received second temporary identity. The processor 610 also controls the receiver 601 and the transmitter 602. Optionally, the processor 610 may be said to comprise one or more of the receiver 601 and the transmitter 602, and/or perform the function thereof as described below. The transmitter 602 is further configured to transmit a fourth random access message to the two or more wireless devices 121, 122 using and/or comprising the identity of the two or more wireless devices 121, 122, respectively, which identity is to be used by each of the two or more wireless devices 121, 122, respectively, when connected to the cell 115.

In some embodiments, the processor 610 may be further configured to determine, or the determining module 611 may be configured to determine, one of the identities of the two or more wireless devices 121, 122 as the first temporary identity, and determine another one of the identities of the two or more wireless devices 121, 122 using at least one received second temporary identity. Optionally, in some embodiments, the processor 610 is further configured to determine, or the determining module 611 may be configured to determine, one or more of the identities of the two or more wireless devices 121, 122 using at least one third temporary identity determined by the network node 110.

In some embodiments, the processor 610 may be further configured to store the determined identity of at least one of the two or more wireless devices 121, 122 for a determined period of time after the at least one of the two or more wireless devices 121, 122 is no longer connected to the cell 115. In this case, the processor 610 may also be configured to exclude the stored identity of the at least one of the two or more wireless devices 121, 122 from being determined as an identity for other wireless devices in the cell 115 for the determined period of time.

In some embodiments, the processor 610 may be configured to determine, or the determining module 611 may be configured to determine, the first temporary identity as the identity of one of the two or more wireless devices 121, 122 when a second temporary identity received from the one of the two or more wireless devices 121, 122 corresponds to an identity already in use by a third wireless device 123 connected to the cell 115 or to a second temporary identity received from another one of the two or more wireless devices 121, 122. In some embodiments, the processor 610 may be configured to, when a second temporary identity received from one of the two or more wireless devices 121, 122 corresponds to an identity already in use by a third wireless device 123 connected to the cell 115, not perform any scheduling of downlink transmissions to the third wireless device 123 in the period of time until the transmitter 620 has transmitted the fourth random access message to the one of the two or more wireless devices 121, 122.

The transmitter 602 may, in some embodiments, be further configured to transmit a determined set of temporary identities to at least one of the two or more wireless devices 121, 122 from which determined set the second temporary identity is to be randomly selected, and wherein the determined set of temporary identities comprise temporary identities that are not included in another set of temporary identities from which the processor 610 selects, or comprises a selecting module 612 which selects, the first temporary identity of wireless devices in the cell 115. In this case, the transmitter 602 may also be configured to perform the transmitting as part of a system information broadcast transmission or as part of the second random access message to at least one of the two or more wireless devices 121, 122. Furthermore, the processor 610 may here be configured to determine, or the determining module 611 may be configured to determine, the first temporary identity or one of the at least one third temporary identity as the identity of one of the two or more wireless devices 121, 122, when a second temporary identity received from the one of the two or more wireless devices 121, 122 is included in the determined set of temporary identities.

The transmitter 602 may, in some embodiments, be configured to transmit information indicating that the network node 110 supports the reception of third random access messages comprising second temporary identities from the two or more wireless devices 121, 122.

Although described above as forming a part of the processor 610, it should be noted that the determining module 611 and the selecting 612 not necessarily need to be comprised in the processor 610, but may be implemented, or available, externally in respect of the processor 610 in the network node 110.

The embodiments for responding to wireless devices 121, 122 performing random access in a cell 115 served by the network node 110 in a wireless communication network 100 may be implemented through one or more processors, such as, e.g. the processor 610 in the network node 110 depicted in FIG. 6, together with computer program code for performing the functions and actions of the embodiments herein. The program code mentioned above may also be provided as a computer program product, for instance in the form of a data carrier carrying computer program code or code means for performing the embodiments herein when being loaded into the processor 610 in the network node 110. The computer program code may e.g. be provided as pure program code in the network node 110 or on a server and downloaded to the network node 110. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The network node 110 may further comprise a memory 620, which may be referred to or comprise one or more memory modules or units. The memory 620 may be arranged to be used to store executable instructions and data to perform the methods described herein when being executed in or by the processor 610 of the network node 110. Those skilled in the art will also appreciate that the processor 610 and the memory 620 described above may refer to a combination of analog and digital circuits, and/or one or more processors configured with software and/or firmware, e.g. stored in the memory 620, that when executed by the one or more processors, such as, the processor 610, cause the one or more processors to perform the method as described above. The processor 610 and the memory 620 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 310, cause the at least one processor to carry out the method for responding to wireless devices 121, 122, 123 performing random access in a cell 115 served by the network node 110 in a wireless communication network 100. Also, some embodiments may further comprise a carrier containing said computer program product, wherein the carrier is one of an electronic signal, optical signal, radio signal, or computer-readable storage medium.

Figure 7:
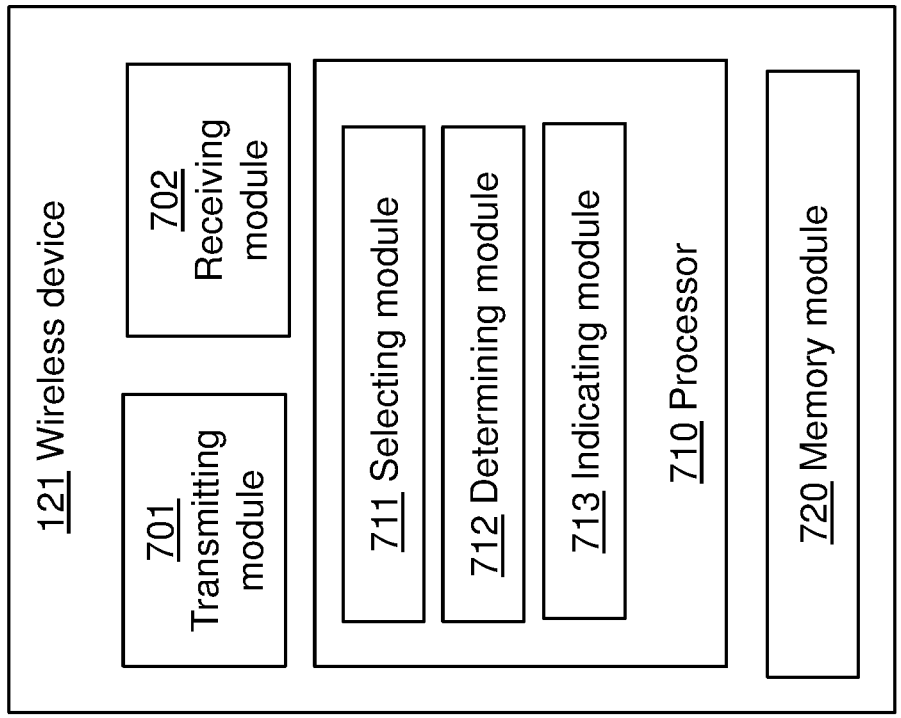
FIG. 7 is a schematic block diagram depicting embodiments of a first wireless device.

To perform the method actions for enabling a network node 110 in a wireless communication network 100 to respond to the first wireless device 121 when the first wireless device 121 performs random access using the same random access preamble as at least a second wireless device 121, 122 in a cell 115 served by the network node 110, the first wireless device 121 may comprise the following arrangement depicted in FIG. 7.

FIG. 7 shows a schematic block diagram of embodiments of the first wireless device 121. In some embodiments, the first wireless device 121 may comprise a receiving module 701, a transmitting module 702, and a processor 710. The receiving module 701 may also be referred to as a receiver or receiving unit, and the transmitting module 702 may also be referred to as transmitter or transmitting unit.

The transmitter 702 is configured transmit a first random access message comprising a random access preamble to the network node 110. The receiver 701 is configured to receive a second random access message comprising a first temporary identity from the network node 110.

The processor 710 may also be referred to as processing module, processing unit or processing circuitry. The processor 710 is configured to select, or comprises a selecting module 711 configured to select, select a second temporary identity of the first wireless device 121. The processor 710 may control the receiver 701 and the transmitter 702. Optionally, the processor 710 may be said to comprise one or more of the receiver 701 and the transmitter 702, and/or perform the function thereof as described below. The transmitter 702 is further configured transmit a third random access message to the network node 110 using the first temporary identity, wherein the third random access message comprises the second temporary identity of the first wireless device 121.

In some embodiments, the receiver 701 is further configured to receive a fourth random access message using the first or second temporary identity. In this case, the processor 710 may be further configured to determine, or comprises a determining module 712 configured to determine, the identity of the first wireless device 121 that is to be used by the first wireless device 121 when connected to the cell 115 as the first or second temporary identity used in the fourth random access message, or as a third temporary identity comprised in the fourth random access message. Also, the processor 710 may further be configured to store the determined identity for a determined period of time when no longer being connected to the cell 115. Here, the processor 710 may also be configured to select, or the selecting module 711 may be configured to select, a stored identity in the first wireless device 121 as the second temporary identity, which stored identity has previously been used by the first wireless device 121 when connected to the cell 115. The stored identity may be a Cell Radio Network Temporary Identifier, C-RNTI.

In some embodiments, the processor 710 may be further configured to randomly select, or the selecting module 711 may be configured to randomly select, an identity in the first wireless device 121 as the second temporary identity when no stored temporary identity previously used in the cell 115 is available. The processor 710 may, according to some embodiments, be further configured to randomly select, or the selecting module 711 may be configured to randomly select, the second temporary identity from a determined set of temporary identities, wherein the determined set of temporary identities comprise temporary identities that are not included in another set of temporary identities from which the processor 710 selects, or the selecting module 711 selects, the first temporary identity of wireless devices in the cell 115. In this case, the receiver 701 may be further configured to receive the determined set of identities as part of a system information broadcast transmission or as part of the second random access message from the network node 110. In some embodiments, the processor 710 is further configured to indicate, or comprises a indicating module 713 configured to indicate, the second temporary identity in the third random access message as an offset, either in relation to a start of a range of temporary identities in the determined set of temporary identities or in relation to the first temporary identity. In some embodiments, the second temporary identity may be a Radio Network Temporary Identifier, RNTI. The transmitter 702 may also further be configured to indicate the second temporary identity in the third random access message in a Cell Radio Network Temporary Identifier, C-RNTI, Medium Access Control, MAC, control element of a MAC Packet Data Unit, PDU, or as an information element in an RRCConnectionRequest message comprised in the third random access message. In some embodiments, the receiver 701 may also further be configured to receive information indicating that the network node 110 supports receiving the third random access message comprising the second temporary identity.

Although described above as forming a part of the processor 710, it should be noted that the selecting module 711, the determining module 712, and the indicating module 713, not necessarily need to be comprised in the processor 710, but may be implemented, or available, externally in respect of the processor 710 in the first wireless device 121.

The embodiments for enabling a network node 110 in a wireless communication network 100 to respond to the first wireless device 121 when the first wireless device 121 performs random access using the same random access preamble as at least a second wireless device 121, 122 in a cell 115 served by the network node 110 may be implemented through one or more processors, such as, e.g. the processor 710 in the first wireless device 121 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processor 710 in the first wireless device 121. The computer program code may e.g. be provided as pure program code the first wireless device 121 or on a server and downloaded to the first wireless device 121. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The first wireless device 121 may further comprise a memory 720, which may be referred to or comprise one or more memory modules or units. The memory 720 may be arranged to be used to store executable instructions and data to perform the methods described herein when being executed in or by the processor 710 of the first wireless device 121. Those skilled in the art will also appreciate that the processor 710 and the memory 720 described above may refer to a combination of analog and digital circuits, and/or one or more processors configured with software and/or firmware, e.g. stored in the memory 720, that when executed by the one or more processors, such as, the processor 710, cause the one or more processors to perform the method as described above. The processor 710 and the memory 720 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 710, cause the at least one processor to carry out the method for enabling a network node 110 in a wireless communication network 100 to respond to the first wireless device 121 when the first wireless device 121 performs random access in a cell 115 served by the network node 110. Also, some embodiments may further comprise a carrier containing said computer program product, wherein the carrier is one of an electronic signal, optical signal, radio signal, or computer-readable storage medium.

The terminology used in the detailed description of the particular embodiments illustrated in the accompanying drawings is not intended to be limiting of the described network node 110, first wireless device 121 and methods therein which instead should be construed in view of the enclosed claims.

As used herein, the term "and/or" comprises any and all combinations of one or more of the associated listed items. Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist. As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

3GPP 3rd Generation Partnership Project
BI Back-off Indicator
C-RNTI Cell Radio Network Temporary Identifier
CSI Channel State Information
DL Downlink
eNB Evolved Node B
EPC Evolved Packet Core
EPS Evolved Packet System
E-UTRA Evolved Universal Terrestrial Radio Access
E-UTRAN Evolved Universal Terrestrial Radio Access Network
FDD Frequency Division Duplex
GPRS General Packet Radio Service
GTPv2-C GPRS Tunnelling Protocol version 2—the control plane part
HSS Home Subscriber Server
ID Identifier/Identity
LTE Long Term Evolution
M2M Machine to Machine
MAC Medium Access Control
MCS Modulation and Coding Scheme
MD Machine Device
MME Mobility Management Entity
MMEC MME Code
MMEGI MME Group ID
MTC Machine Type Communication
NAS Network Access Stratum
PCRF Policy and Charging Rules Function
PDCCH Physical Downlink Control Channel
PDSCH Physical Downlink Shared Channel
PDN Packet Data Network
PDU Packed Data Unit
PGW PDN Gateway
PRACH Physical Random Access Channel
PUSCH Physical Uplink Shared Channel
RA Random Access
RAPID Random Access Preamble ID
RAR Random Access Response
RA-RNTI Random Access RNTI
RNTI Radio Network Temporary Identifier
RRC Radio Resource Control
R-RNTI Random RNTI
S1 The interface between E-UTRAN and EPC
S1AP S1 Application Protocol
SAE System Architecture Evolution
SGW Serving Gateway
S-TMSI SAE Temporary Mobile Subscriber Identity
TDD Time Division Duplex
TPC Transmit Power Command
TS Technical Specification
UE User Equipment
UL Uplink

The invention claimed is:

1. A method performed by a network node for responding to two or more wireless devices performing random access in a cell served by the network node in a wireless communication network, the method comprising:
receiving first random access messages from the two or more wireless devices comprising identical random access preambles;
transmitting a second random access message comprising a first temporary identity to the two or more wireless devices;
receiving third random access messages from the two or more wireless devices, wherein at least one of the third random access messages comprises a second temporary identity;
determining different identities for the two or more wireless devices using at least one received second temporary identity; and
transmitting a fourth random access message to the two or more wireless devices using and comprising the identity of the two or more wireless devices, respectively, which identity is used by each of the two or more wireless devices, respectively, when connected to the cell, wherein, when the second temporary identity received from one of the two or more wireless devices corresponds to an identity already in use by a third wireless device connected to the cell, no scheduling of downlink transmissions to the third wireless device is performed until the fourth random access message has been transmitted to the one of the two or more wireless devices.

2. The method according to claim 1, further comprising determining one of the identities of the two or more wireless devices as the first temporary identity, and determining another one of the identities of the two or more wireless devices using at least one received second temporary identity.

3. The method according to claim 2, further comprising determining one or more of the identities of the two or more wireless devices using at least one third temporary identity determined by the network node.

4. The method according to claim 1, further comprising:
storing the identity of at least one of the two or more wireless devices for a determined period of time after the at least one of the two or more wireless devices is no longer connected to the cell, and
excluding the stored identity of the at least one of the two or more wireless devices from being determined as an identity for other wireless devices in the cell for the determined period of time.

5. The method according to claim 1, further comprising determining the first temporary identity as the identity of one of the two or more wireless devices when a second temporary identity received from the one of the two or more wireless devices corresponds to an identity already in use by a third wireless device connected to the cell or to a second temporary identity received from another one of the two or more wireless devices.

6. The method according to claim 1, further comprising transmitting a determined set of temporary identities to at least one of the two or more wireless devices from which determined set the second temporary identity is randomly selected, and wherein the determined set of temporary identities comprise temporary identities that are not included in another set of temporary identities from which the network node selects the first temporary identity of wireless devices in the cell.

7. A network node for responding to two or more wireless devices performing random access in a cell served by the network node in a wireless communication network, comprising:
a receiver configured to receive first random access messages from the two or more wireless devices comprising identical random access preambles, and
a transmitter configured to transmit a second random access message comprising a first temporary identity to the two or more wireless devices, wherein:
the receiver is further configured receive third random access messages from the two or more wireless devices, wherein at least one of the third random access messages comprises a second temporary identity,
the network node further comprises a processor configured to determine different identities for the two or more wireless devices using at least one received second temporary identity, and
the transmitter is further configured to transmit a fourth random access message to the two or more wireless devices using and comprising the identity of the two or more wireless devices, respectively, which identity is used by each of the two or more wireless devices, respectively, when connected to the cell, wherein the processor is further configured to, when a second temporary identity received from one of the two or more wireless devices corresponds to an identity already in use by a third wireless device connected to the cell, not perform any scheduling of downlink transmissions to the third wireless device until the transmitter has transmitted the fourth random access message to the one of the two or more wireless devices.

8. The network node according to claim 7, wherein the processor is further configured to determine one of the identities of the two or more wireless devices as the first temporary identity, and determine another one of the identities of the two or more wireless devices using at least one received second temporary identity.

9. The network node according to claim 8, wherein the processor is further configured to determine one or more of the identities of the two or more wireless devices using at least one third temporary identity determined by the network node.

10. The network node according to claim 7, wherein the processor is further configured to store the determined identity of at least one of the two or more wireless devices for a determined period of time after the at least one of the two or more wireless devices is no longer connected to the cell, and exclude the stored identity of the at least one of the two or more wireless devices from being determined as an identity for other wireless devices in the cell for the determined period of time.

11. The network node according to claim 7, wherein the processor is further configured to determine the first temporary identity as the identity of one of the two or more wireless devices when a second temporary identity received from the one of the two or more wireless devices corresponds to an identity already in use by a third wireless device connected to the cell or to a second temporary identity received from another one of the two or more wireless devices.

12. The network node according to claim 7, wherein the transmitter is further configured to transmit a determined set of temporary identities to at least one of the two or more wireless devices from which determined set the second temporary identity is randomly selected, and wherein the determined set of temporary identities comprise temporary identities that are not included in another set of temporary identities from which the processor selects the first temporary identity of wireless devices in the cell.

13. The network node according to claim 7, further comprising a memory wherein said memory is containing instructions executable by said processor.

14. A method performed by a first wireless device for enabling a network node in a wireless communication network to respond to the first wireless device when the first wireless device performs random access using the same random access preamble as at least a second wireless device in a cell served by the network node, the method comprising:
transmitting a first random access message comprising a random access preamble to the network node;
receiving a second random access message comprising a first temporary identity from the network node;
selecting a second temporary identity of the first wireless device;
transmitting a third random access message to the network node using the first temporary identity, which third random access message comprises the second temporary identity of the first wireless device:

receiving a fourth random access message using the first or second temporary identity, and determining the identity of the first wireless device that is used by the first wireless device when connected to the cell as the identity of the first or second temporary identity used in the fourth random access message, or as a third temporary identity comprised in the fourth random access message.

15. The method according to claim 14, further comprising:

storing the determined identity for a determined period of time when no longer being connected to the cell.

16. The method according to claim 15, further comprising selecting a stored identity in the first wireless device as the second temporary identity, which stored identity has previously been used by the first wireless device when connected to the cell.

17. The method according to claim 14, further comprising randomly selecting an identity in the first wireless device as the second temporary identity.

18. The method according to claim 17, wherein the second temporary identity is randomly selected from a determined set of temporary identities, wherein the determined set of temporary identities comprise temporary identities that are not included in another set of temporary identities from which the network node selects the first temporary identity of wireless devices in the cell.

19. The method according to claim 18, further comprising:

receiving the determined set of identities as part of a system information broadcast transmission or as part of the second random access message from the network node.

20. The method according to claim 17, further comprising indicating the second temporary identity in the third random access message as an offset, either in relation to a start of a range of temporary identities in the determined set of temporary identities or in relation to the first temporary identity.

21. The method according to claim 14, further comprising:

receiving information indicating that the network node supports receiving the third random access message comprising the second temporary identity.

22. A first wireless device for enabling a network node in a wireless communication network to respond to the first wireless device when the first wireless device performs random access using the same random access preamble as at least a second wireless device in a cell served by the network node, the first wireless device comprising:

a transmitter configured to transmit a first random access message comprising a random access preamble to the network node, a receiver configured to receive a second random access message comprising a first temporary identity from the network node, and a processor configured to select a second temporary identity of the first wireless device, wherein the transmitter is further configured to transmit a third random access message to the network node using the first temporary identity, which third random access message comprises the second temporary identity of the first wireless device, wherein the receiver is further configured to receive a fourth random access message using the first or second temporary identity, and the processor is further configured to determine the identity of the first wireless device that is used by the first wireless device when connected to the cell as the identity of the first or second temporary identity used in the fourth random access message, or as a third temporary identity comprised in the fourth random access message.

23. The first wireless device according to claim 22, wherein the processor is further configured to store the determined identity for a determined period of time when no longer being connected to the cell.

24. The first wireless device according to claim 23, wherein the processor is further configured to select a stored identity in the first wireless device as the second temporary identity, which stored identity has previously been used by the first wireless device when connected to the cell.

25. The first wireless device according to claim 22, wherein the processor is further configured to randomly select an identity in the first wireless device as the second temporary identity.

26. The first wireless device according to claim 25, wherein the processor is further configured to randomly select the second temporary identity from a determined set of temporary identities, wherein the determined set of temporary identities comprise temporary identities that are not included in another set of temporary identities from which the processor selects the first temporary identity of wireless devices in the cell.

27. The first wireless device according to claim 26, wherein the receiver is further configured to receive the determined set of identities as part of a system information broadcast transmission or as part of the second random access message from the network node.

28. The first wireless device according to claim 22, wherein the processor is further configured to indicate the second temporary identity in the third random access message as an offset, either in relation to a start of a range of temporary identities in the determined set of temporary identities or in relation to the first temporary identity.

29. The first wireless device according to claim 22, wherein the receiver is further configured to receive information indicating that the network node supports receiving the third random access message comprising the second temporary identity.

30. The first wireless device according to claim 22, further comprising a memory wherein said memory is containing instructions executable by said processor.

* * * * *